C. E. COE.
BELT FASTENER.
APPLICATION FILED FEB. 20, 1911.
1,062,078.
Patented May 20, 1913.
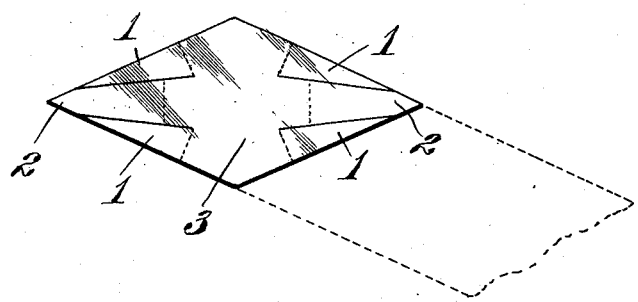
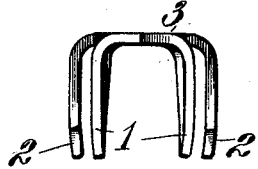 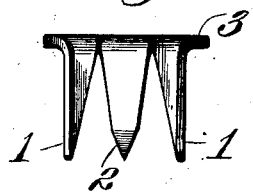
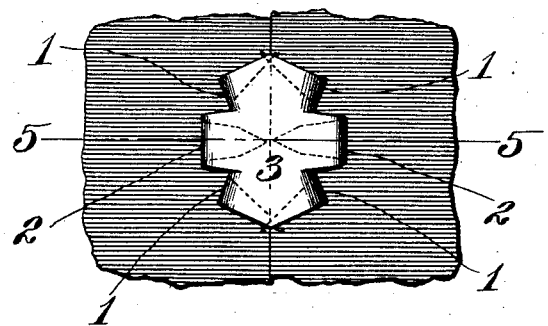
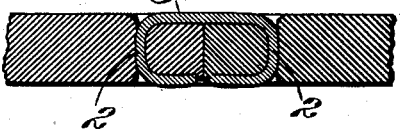
Attest:
Wm. H. Scott
E. L. Wallace
Inventor:
Charles E. Coe,
by Higdon Longan
Attys.

UNITED STATES PATENT OFFICE.

CHARLES E. COE, OF ST. LOUIS, MISSOURI, ASSIGNOR TO WILLIAM F. MORRISON, OF ST. LOUIS, MISSOURI.

BELT-FASTENER.

1,062,078. Specification of Letters Patent. Patented May 20, 1913.

Application filed February 20, 1911. Serial No. 609,664.

*To all whom it may concern:*

Be it known that I, CHARLES E. COE, a citizen of the United States, and resident of St. Louis, Missouri, have invented certain new and useful Improvements in Belt-Fasteners, of which the following is a specification containing a full, clear, and exact description, reference being had to the accompanying drawings, forming a part hereof.

My invention relates to improvements in belt fasteners, and has for its object the construction of a fastener wherein the teeth are so formed as to give greater strength to the teeth.

To the above purposes, my invention consists in certain novel features of construction and arrangement of parts which will be hereinafter more fully set forth, pointed out in the claim, and illustrated in the accompanying drawings, in which:

Figure 1 is a top plan view, showing a piece of metal from which the fastener is made and cut to form teeth; Fig. 2 is a side view of the fastener after the teeth have been bent; Fig. 3 is an end view; Fig. 4 represents a top plan view of my fastener applied to a belt; and Fig. 5 is a section taken on the line 5—5 of Fig. 4.

The object of my invention, as above stated, is to construct a fastener having specially formed and arranged teeth, the outside tooth 1 of each end of the fastener being arranged at an angle to the intermediate tooth 2, and the intermediate tooth 2 being arranged out of alinement with the outside teeth 1 and having the teeth all of the same length after they are bent.

In the formation of my fastener the blank from which it is formed is cut diagonally from a strip of metal and is substantially diamond shape, and when it is stamped out the outside teeth 1 on each end before being bent are longer than the intermediate tooth 2 on each end, but when the teeth are bent the intermediate tooth 2 is bent where indicated by the dotted lines, shown in Fig. 1, which makes all the teeth after being bent of substantially equal length.

Another feature of my invention is to have the outside edge of each tooth 1 straight or vertical, the bevel being on the inside of each outside tooth. By doing this, when the fastener is inserted in the belt, there is a tendency of wedging the belt material between the outside teeth 1 on each end.

In Fig. 1 I have illustrated the metal out of which the fastener is formed, and the manner in which the same is slitted to form teeth, and in dotted lines the lines on which the teeth are bent, wherein it will be seen that the outside teeth on each end are bent at an angle relative to the top or body portion of the fastener 3 and to the intermediate teeth 2. By doing this, when the teeth are inserted through the belting, as illustrated in Fig. 4, the said teeth pass through the belt at an angle to its contacting ends, and the teeth being arranged at such an angle will be harder to bend by the strain incident to use. In other words, the outside teeth will not be so easily bent because they are disposed at an angle relative to the strain.

Another feature of my fastener is having the lower sharpened points of the teeth inwardly bent, as illustrated in Fig. 2, which make the teeth easier to clench, and when clenched the terminal points are embedded in the belting, as illustrated in Fig. 5.

In an application executed by me on an even date herewith and filed February 20, 1911, Serial No. 609,663, I have claimed a machine for making my improved belt fastener.

I claim:

As a new article of manufacture, a belt fastener, constructed of a single diamond-shaped piece of sheet metal forming a substantially flat body portion, having at opposite ends three teeth defined by slits in the body portion and bent at right angles to the body of the fastener, the outermost teeth being bent on lines nearer to the center of the fastener than the bending lines of the innermost teeth, the bending lines of the innermost teeth being at right angles to the bodies of the teeth, and the bending lines of the outermost teeth being at an angle relative to the bending lines of the innermost teeth, the margins of the outermost teeth being continuous straight lines from their bases to their points, the outermost of said margins being perpendicular to the body of the fastener, the innermost of said margins being at angles relative to the outermost margins, the margins of the innermost teeth tapering from their bases to points adjacent the free ends and from these points converging to the free ends, said teeth and said flat body portion utilizing all of the pieces of sheet metal without waste.

In testimony whereof, I have signed my name to this specification, in presence of two subscribing witnesses.

CHARLES E. COE.

Witnesses:
E. L. WALLACE,
N. G. BUTLER.